(12) United States Patent
Mitsuda

(10) Patent No.: US 6,866,702 B2
(45) Date of Patent: Mar. 15, 2005

(54) DEVICE FOR ABSORBING CARBON DIOXIDE, AND A METHOD FOR ABSORBING CARBON DIOXIDE

(75) Inventor: Hisateru Mitsuda, Kyoto (JP)

(73) Assignee: International Environmental Conservative Association, Inc., Los Angeles, CA (US)

( * ) Notice: Subject to any disclaimer, the term of this patent is extended or adjusted under 35 U.S.C. 154(b) by 0 days.

(21) Appl. No.: 10/352,856

(22) Filed: Jan. 29, 2003

(65) Prior Publication Data

US 2004/0144251 A1 Jul. 29, 2004

(51) Int. Cl.$^7$ .......................... B01D 53/04; B01D 53/62
(52) U.S. Cl. .............................. 96/134; 95/139; 96/147; 55/385.1; 55/385.3; 423/213.2; 423/230; 423/232
(58) Field of Search .................... 95/139, 108, 134, 95/135, 147, 153; 55/385.1, 385.3; 423/213.2, 213.7, 230, 232

(56) References Cited

U.S. PATENT DOCUMENTS

| | | | | |
|---|---|---|---|---|
| 3,527,618 A | * | 9/1970 | Bushnell | 429/12 |
| 3,660,023 A | * | 5/1972 | Frevel et al. | 423/230 |
| 3,988,422 A | * | 10/1976 | Kruger | 423/232 |
| 3,990,872 A | * | 11/1976 | Cullen | 96/6 |
| 4,492,649 A | * | 1/1985 | Cheh et al. | 588/2 |
| 4,540,553 A | * | 9/1985 | Hagiwara et al. | 423/230 |
| 4,552,767 A | * | 11/1985 | Saleeb et al. | 426/395 |
| 4,830,643 A | * | 5/1989 | Sassa et al. | 96/108 |
| 4,937,059 A | * | 6/1990 | Kolts et al. | 423/230 |
| 4,977,634 A | * | 12/1990 | Koji | 5/638 |
| 5,030,610 A | * | 7/1991 | Sakata et al. | 502/400 |
| 5,214,019 A | * | 5/1993 | Nalette et al. | 502/400 |
| 5,298,475 A | * | 3/1994 | Shibata et al. | 502/400 |
| 5,322,701 A | * | 6/1994 | Cullen et al. | 426/124 |
| 5,454,968 A | * | 10/1995 | Nalette et al. | 252/192 |
| 5,455,013 A | * | 10/1995 | Shibata et al. | 423/230 |
| 5,595,949 A | * | 1/1997 | Goldstein et al. | 502/20 |
| 5,656,064 A | * | 8/1997 | Golden et al. | 95/96 |
| 6,271,172 B2 | * | 8/2001 | Ohashi et al. | 502/400 |
| 6,387,845 B1 | * | 5/2002 | Masahiro et al. | 502/407 |
| 6,432,172 B1 | * | 8/2002 | Lawrence et al. | 95/139 |

* cited by examiner

Primary Examiner—Robert H. Spitzer
(74) Attorney, Agent, or Firm—Westerman, Hattori, Daniels & Adrian, LLP

(57) ABSTRACT

The present invention relates to a device for absorbing carbon dioxide, which is equipped along an automobile exhaust pipe and a factory chimney. The present invention also relates to a method for absorbing carbon dioxide. According to the present invention, there is provided a device for absorbing carbon dioxide, comprising a housing 4 of a material having air permeability; a cement composition for absorbing carbon dioxide, enclosed inside the housing 4; and a pipe 5 across the housing, the pipe having an inlet 2 and an outlet 3. According to the present invention, when a gas is introduced from the inlet 2, carbon dioxide in the gas is absorbed by the carbon dioxide absorbing materials such as a cement composition enclosed in the housing 4. The gas is discharged from the outlet 3.

3 Claims, 3 Drawing Sheets

DEVICE FOR ABSORBING CARBON DIOXIDE, AND A METHOD FOR ABSORBING CARBON DIOXIDE

BACKGROUND OF THE INVENTION

The present invention relates to a device for absorbing carbon dioxide, which may be equipped on an automobile exhaust pipe or a factory chimney. The present invention also relates to a method for absorbing carbon dioxide.

RELATED ART

The stemming of the warming of the Earth is one of the most difficult objectives to be solved. The average temperature of the Earth has been recently rising gradually. If it continues, the icebergs in the south and north poles will be melted, significantly raising the sea level, resulting in the submerging of many islands and properties. In addition, the concomitant breakdown of the Earth's ecology would affect the creatures including human beings. The cause of the warming of the Earth is said to be the recent increase of the amount of carbon dioxide discharged.

The objectives of the present invention are to absorb carbon dioxide and to reduce its amount discharged, resulting in contributing to stem the warming of the Earth.

SUMMARY OF THE INVENTION

The inventor of the present invention has researched to solve the objective to stem the warming of the Earth, and then, found a carbon dioxide absorbing material such as a cement composition. According to the present invention, there is provided a device for absorbing carbon dioxide, comprising a housing of an air permeable material; and a carbon dioxide absorbing material enclosed inside the housing. According to the present invention, when a gas is passed through the housing, carbon dioxide in the gas is absorbed. The housing may be placed inside a pipe having an inlet and an outlet.

In addition, there is provided a method for absorbing carbon dioxide. The method comprises the following steps: providing a housing of an air permeable material; enclosing a carbon dioxide absorbing material inside the housing; and passing a gas through the housing to absorb carbon dioxide in the gas.

DETAILED DESCRIPTION OF THE INVENTION

Figure 1:
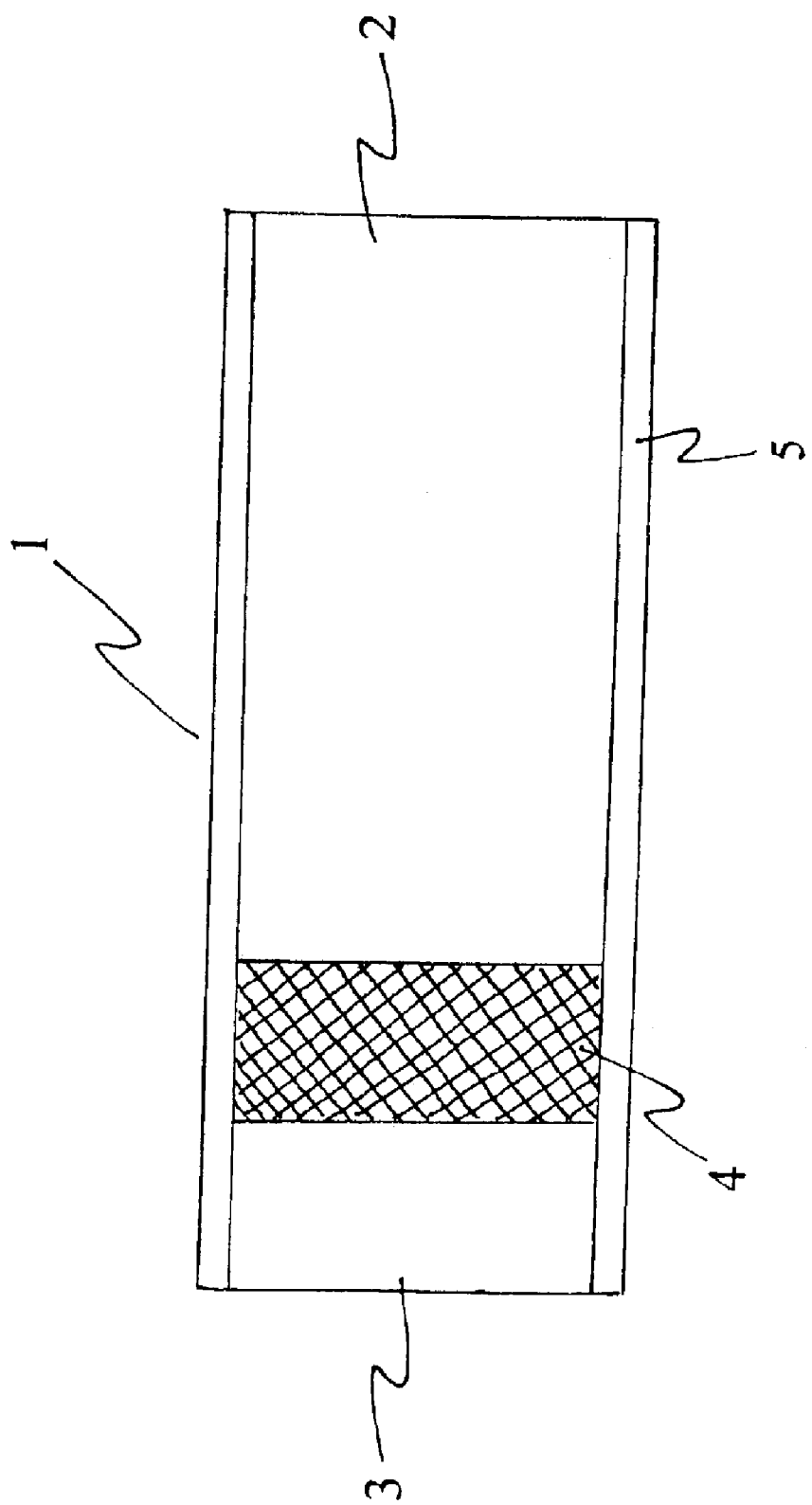
FIG. 1 shows a cross sectional view of the device to absorb carbon dioxide according to the present invention.
Figure 2:
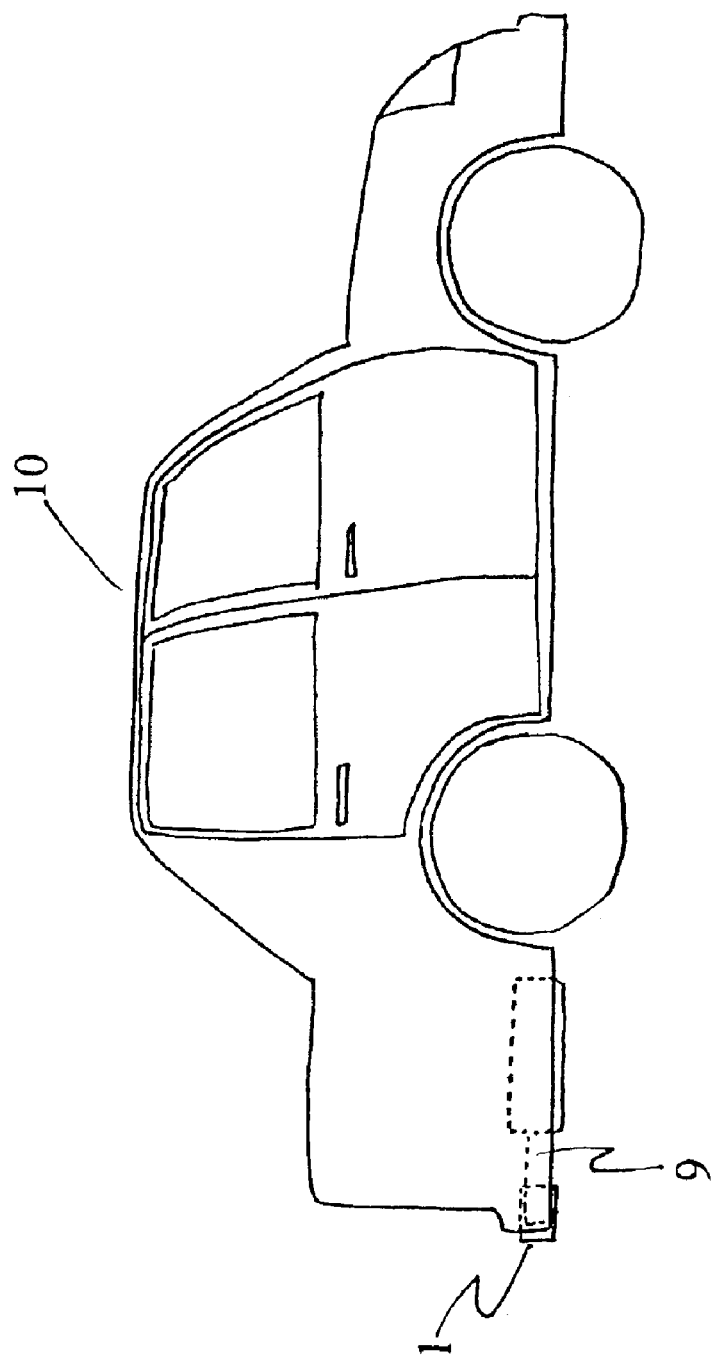
FIG. 2 shows a view where the device of the invention is equipped at the end of an exhaust pipe of an automobile.
Figure 3:
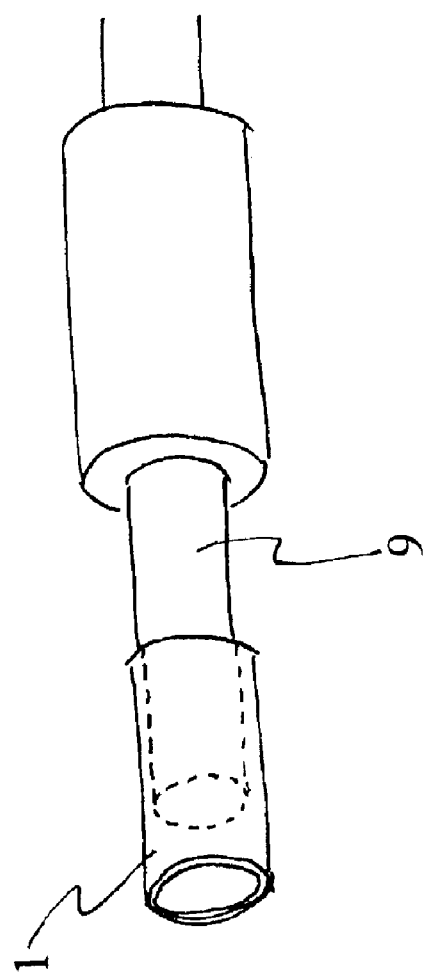
FIG. 3 shows a magnified view of the present invention equipped at the end of an exhaust pipe of an automobile.

FIG. 1 shows a device 1 to absorb carbon dioxide according to the present invention. As shown in FIG. 1, the device 1 for absorbing carbon dioxide has a housing 4 of an air permeable material. The housing 4, as shown in FIG. 1, is a net. Alternatively, the housing may be made of, for example, a woven or non-woven sheet or paper having air permeability. Inside the housing 4, a carbon dioxide absorbing material, such as a cement composition, is enclosed. The housing 4 is placed inside a pipe 5. The pipe 5 has an inlet 2 and an outlet 3. The device, as shown in FIG. 1, is equipped along an exhaust pipe 9 of an automobile 10, as shown in FIGS. 2 and 3. Alternatively, the device may be equipped along a chimney and so on. The device is intended to absorb carbon dioxide. When an exhaust gas from the automobile 10 or chimney is introduced from the inlet 2 of the pipe 5, carbon dioxide in the exhaust gas is absorbed by the carbon dioxide absorbing material enclosed inside the housing 4. After such treatment, the exhaust gas is discharged from the outlet 3. According to the present invention, the exhaust gas efficiently contacts with the carbon dioxide absorbing material. The pipe has several hooks inside the surface, to engage it with the housing 4.

In addition, on the outlet 3 of the pipe 5, a filter may be provided to trap the powder of the cement composition leaked from the housing 4.

Next, a carbon dioxide absorbing material according to the present invention is explained in detail. As the carbon dioxide absorbing material, a cement composition is preferable to use. According to the present invention, the cement composition may be selected from the group consisting of aluminous cement, magnesia cement, silica cement, Portland cement, blast furnace cement, fly ash cement, slag cement, sulfate resisting cement, high early strength cement, ultra high early strength cement, moderate heat of hardening cement, white cement, expansive cement, and the mixtures thereof. Especially, it is preferable to use a Portland cement.

According to the present invention, the carbon dioxide absorbing material may include CaO in addition to $SiO_2$, $Al_2O_3$, $Fe_2O_3$, MgO, $Na_2O$, $SO_3$ and so on, which is not limited.

According to the present invention, the carbon dioxide absorbing material may include CaO, which is considered to mainly play a role to absorb carbon dioxide. The mechanism for the cement composition to absorb carbon dioxide is not scientifically clarified. The inventor considers that one of the dominant mechanisms is as follows. However, it should be noted that the presumed mechanisms is not limited to the present invention, even if it will be turned out to be wrong.

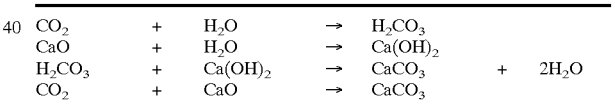

$CO_2 + H_2O \rightarrow H_2CO_3$
$CaO + H_2O \rightarrow Ca(OH)_2$
$H_2CO_3 + Ca(OH)_2 \rightarrow CaCO_3 + 2H_2O$
$CO_2 + CaO \rightarrow CaCO_3$ In the mechanism, water ($H_2O$) is necessary for CaO to absorb carbon dioxide. However, too much water will adversely affect the efficiency of the absorption of carbon dioxide, since water solidifies the cement composition. Therefore, the content of water in the carbon dioxide absorbing material, or cement composition, is controlled as little as possible. Generally, it is unnecessary to add water into the cement composition since the exhaust gas from automobiles or factories already include water to the extent to promote the reactions shown in the above formula.

The carbon dioxide absorbing material may include CaO. The content of CaO in the carbon dioxide absorbing material is not limited in the present invention, but it is preferable that the content of CaO is 40 to 80% by weight, and especially 55 to 70% by weight, and more especially 60 to 67% by weight.

According to the present invention, the carbon dioxide absorbing material may include $SiO_2$. The content of $SiO_2$ in the carbon dioxide absorbing material is not limited in the present invention, but it is preferable that the content of $SiO_2$ is 5 to 50% by weight, and especially 13 to 30% by weight, and more especially 17 to 25% by weight.

According to the present invention, the carbon dioxide absorbing material may include $Al_2O_3$. The content of $Al_2O_3$ in the carbon dioxide absorbing material is not limited in the present invention, but it is preferable that the content of $Al_2O_3$ is 1 to 20% by weight, and especially 2 to 10% by weight, and more especially 3 to 8%/, by weight.

According to the present invention, the carbon dioxide absorbing material may include $Fe_2Ol$. The content of $Fe_2O_3$ in the carbon dioxide absorbing material is not limited in the present invention, but it is preferable that the content of $Fe_2O_3$ is 0.1 to 15% by weight, and especially 0.3 to 10% by weight, and more especially 0.5 to 6% by weight.

According to the present invention, the carbon dioxide absorbing material may include MgO. The content of MgO in the carbon dioxide absorbing material is not limited in the present invention, but it is preferable that the content of MgO is 0.001 to 10% by weight, and especially 0.01 to 7% by weight, and more especially 0.1 to 5.5% by weight.

According to the present invention, the carbon dioxide absorbing material may include $Na_2O$ and/or $K_2O$. The content of $Na_2O$ and/or $K_2O$ in the carbon dioxide absorbing material is not limited in the present invention, but it is preferable that the content of $Na_2O$ and/or $K_2O$ is 0.01 to 5% by weight, and especially 0.05 to 3% by weight, and more especially 0.5 to 1.3% by weight.

According to the present invention, the carbon dioxide absorbing material may include $SO_3$. The content of $SO_3$ in the carbon dioxide absorbing material is not limited in the present invention, but it is preferable that the content of $SO_3$ is 0.01 to 7% by weight, and especially 0.1 to 5% by weight, and more especially 1 to 3% by weight.

In the case of using a cement composition as the carbon dioxide absorbing material, the cement composition is preferably in a form of powder. The cement composition used in the present invention preferably has an averaged particle size between 0.1 and 100 $\mu$m. According to the present invention, the housing is preferably made of net having air permeability. The net has a mesh size smaller than the average of the particle size of the cement composition. Instead, the housing may be made of alternative material discussed before. In order to trap the cement composition leaked from the net, the device of the present invention further comprises a filter provided on the outlet. According to the present invention, the housing enclosing the carbon dioxide absorbing material, and especially cement composition, preferably has a thickness of 1 to 100 mm. The device of the present invention is preferably equipped along the exhaust pipe of an automobile or along a chimney, so as to absorb carbon dioxide.

Next, examples are shown, which are contemplated by the inventors as best modes, but the present invention is not limited thereto. Those skilled in the art may modify the example within the scope of the invention defined by the claims.

EXAMPLE 1

As the carbon dioxide absorbing material, the following cement composition was provided.
CaO in an amount of 60 to 67% by weight,
$SiO_2$ in an amount of 17 to 25% by weight,
$Al_2O_3$ in an amount of 3 to 8% by weight,
$Fe_2O_3$ in an amount of 0.5 to 6% by weight,
MgO in an amount of 0.1 to 5.5% by weight,
$Na_2O$ and/or $K_2O$ in an amount of 0.5 to 1.3% by weight, and
$SO_3$ $\mu$l an amount of 1 to 3% by weight.

The cement composition was in the form of powder. The cement composition was enclosed in a net having a mesh smaller than the average particle size of the cement composition.

The net including the cement composition prepared in Example 1 was placed inside a pipe to form a device to absorb carbon dioxide according to the present invention. Then, the device was equipped at the end of an exhaust pipe of an automobile.

EXAMPLE 2

The net including the ceramic composition prepared in Example 1 was placed inside a pipe to form a device to absorb carbon dioxide according to the present invention. Then, the device was equipped at the end of an exhaust pipe of an automobile.

The amount of the discharge of carbon dioxide was measured. The result proved that the device of the present invention could absorb carbon dioxide and significantly decrease the concentration of carbon dioxide in the discharged exhaust gas.

EXAMPLE 3

The net including the cement composition produced in Example 1 was placed inside a pipe to form to absorb carbon dioxide according to the present invention. Then, the device was equipped of chimney of a chemical factory.

The amount of the discharge of carbon dioxide was measured. The result proved that the device of the present invention could absorb carbon dioxide and significantly decrease the concentration of carbon dioxide in the discharged exhaust gas.

What is claimed is:

1. A device for absorbing carbon dioxide, comprising:
   a housing of an air permeable material; and
   a carbon dioxide absorbing material including CaO enclosed inside the housing;
   wherein a gas is passed through the housing to absorb carbon dioxide in the gas,
   wherein the carbon dioxide absorbing material including CaO is selected from the group consisting of aluminous cement, magnesia cement, silica cement, Portland cement, blast furnace cement, fly ash cement, slag cement, sulfate resisting cement, high early strength cement, ultra high early strength cement, moderate heat of hardening cement, white cement, expansive cement, and mixtures thereof.

2. A device for absorbing carbon dioxide, comprising:
   a housing of an air permeable material; and
   a carbon dioxide absorbing material including CaO enclosed inside the housing;
   wherein a gas is passed through the housing to absorb carbon dioxide in the gas,
   wherein the carbon dioxide absorbing material including CaO is a Portland cement.

3. A device for absorbing carbon dioxide, comprising:
   a housing of an air permeable material; and
   a carbon dioxide absorbing material including CaO enclosed inside the housing;
   wherein a gas is passed through the housing to absorb carbon dioxide in the gas,
   wherein the carbon dioxide absorbing material including CaO comprises:
   CaO in an amount of 60 to 67% by weight,
   $SiO_2$ in an amount of 17 to 25% by weight,
   $Al_2O_3$ in an amount of 3 to 8% by weight,
   $Fe_2O_3$ in an amount of 0.5 to 6% by weight,
   MgO in an amount of 0.1 to 5.5% by weight,
   $Na_2O$ and/or $K_2O$ in an amount of 0.5 to 1.3% by weight, and
   $SO_3$ in an amount of 1 to 3% by weight.

* * * * *